Jan. 4, 1949.   C. L. LUDWIG   2,458,085
PLUNGER FED DROPPER
Filed Jan. 22, 1944
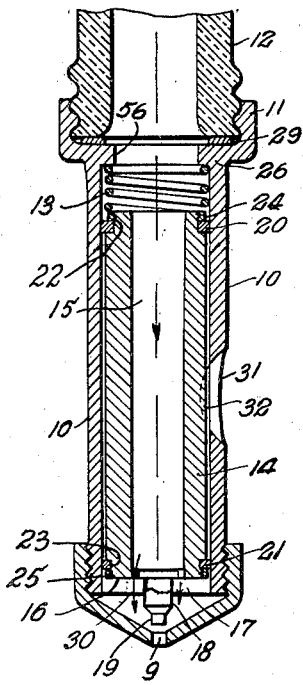
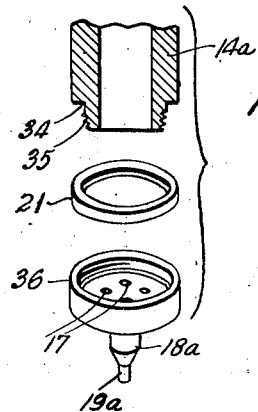
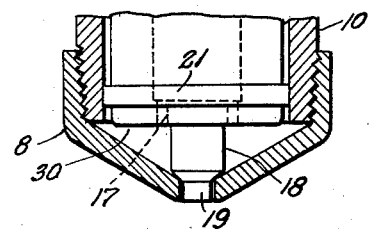
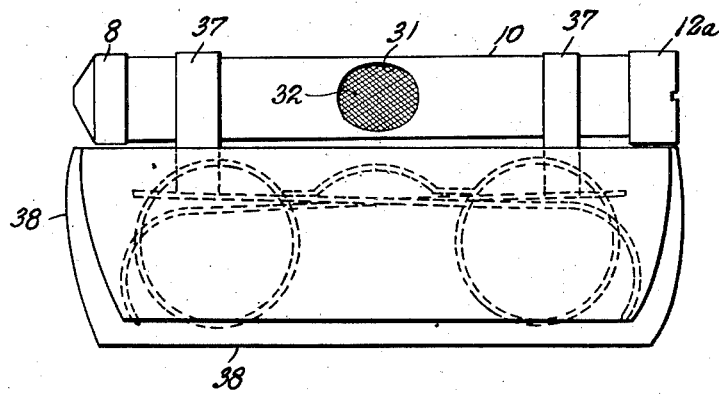
INVENTOR.
CARL L. LUDWIG
BY
C. Laurin Maloby
ATTORNEY Patented Jan. 4, 1949

2,458,085

UNITED STATES PATENT OFFICE 2,458,085

PLUNGER FED DROPPER

Carl L. Ludwig, Los Angeles, Calif.

Application January 22, 1944, Serial No. 519,289

2 Claims. (Cl. 222—386)

This invention relates to measuring and dispensing containers and more especially to dispensers adapted for repeat operation without inverting the container to release the air lock. This application includes subject matter disclosed in my co-pending application, Serial No. 398,874, filed June 20, 1941, now Patent No. 2,366,343, January 2, 1945.

This invention is adapted for measuring and dispensing liquids, powder or granular material, either in exact or approximately measured quantities.

An object of the invention is to provide a simplified device of the character described, containing few parts, and simple in construction.

Another object of the invention is to provide a container for dispensing a pre-determined amount of material by a simple operation.

An additional object is to provide a dispensing container for liquids whereby to dispense small quantities such as a single drop at a time.

A further object is to provide a single drop dispenser for a special use such as a liquid for cleaning eye glasses or spectacles.

An additional object is to provide a drop dispenser for a viscous material.

Other objects and advantages will appear and be brought out more fully in the following specification, reference being had to the accompanying drawing wherein:

Fig. 1 is a longitudinal sectional view of an embodiment of my invention for dispensing liquid in drops.

Fig. 2 is a fragmentary view, enlarged, partly in section, of the device of Fig. 1.

Fig. 3 is an exploded view of a modification in part of the structure of Figs. 1 and 2.

Fig. 4 is a view showing the device of Figs. 1 to 3 in combination with a spectacle case.

Referring more particularly to the drawing I show a device for dispensing liquids drop by drop, comprising a casing 10 of any suitable material such as glass, plastic or the like, having threaded neck 11 for attachment to the neck portion 12 of a suitable container for the liquid to be dispensed. A shell 14 is positioned in casing 10 and has a central opening extending from end 15 almost to the other end 16, which is closed except for a series of holes 17 which extend through this end near the outer periphery of the large central bore. End 16 has a reduced portion 18 which tapers to a further reduced portion or teat 19.

The external end of shell 14 is reduced at both ends to receive resilient washers 20 and 21, and the extreme ends of these reduced portions are threaded, as shown at 22 and 23 to receive correspondingly threaded nuts 24 and 25. These nuts keep the washers 20 and 21 under pressure so that they fill out any irregularities on the inside of the casing 10.

Before shell 14, carrying the washers and nuts, is placed inside of casing 10, a spring 13 is first inserted. An end piece 8 having a tapered nozzle portion provided with a dispensing aperture 9, is provided for screw thread attachment to casing 10, and is then secured thereto by said threaded attachment. A gasket or washer 29 is positioned between container 12 and neck portion 11 of casing 10. The pressure of spring 13 expanding between flange 26 and end 15 of shell 14, forces shell 14 in the direction indicated by the arrow in the central bore, and causes the small end 19 normally to close, dispensing aperture 9 in end piece 8, as shown in Fig. 2.

When the container is inverted, as shown in Figs. 1 to 3, liquid from the container flows through the central opening in shell 14 and through holes 17 in end 16 into cavity 30 in end piece 8. Washers 20 and 21 prevent liquid from escaping into the space between the outside of shell 14 and the inside of casing 10. The reduced end 18—19 of the shell closes aperture 9 in the tip of end piece 8, and the fluid is thus retained inside of the device. Casing 10 is provided with an aperture 31, and shell 14 has a knurled or roughened portion 32 opposite aperture 31 to permit insertion of a finger or the thumb through aperture 31 to move shell 14 up or down. When it is desired to expel a drop of the liquid, shell 14 is moved in a direction opposite to the arrow in the bore thereof, thus causing teat 19 to move out of aperture 9. The fluid then moves into aperture 9, where it is retained by adhesion, cohesion and the pressure of external air. Upon the release of shell 14, spring 13 pushes the same downwardly, causing teat 19 to enter aperture 11 and expel a drop of liquid therein. This device may be designed for drops of different sizes, varying with the viscosity of the liquid, by changing the dimensions of aperture 9 and teat 19.

In Fig. 3 I show a modification of the structure for the lower end 16 of shell 14. The construction shown in Figs. 1 and 2 requires that the shell be cast or machined, as by a screw machine. The modified structure permits the use of standard tubing by merely reducing the ends as shown at 34, and threading the extreme end as indicated at 35. For this modification the end portion 18a—19a is made integral with the nut or threaded end member 36, which has the outlet apertures 17.

In assembly, washer 21 is placed over reduced end 34, and member 36 is then threaded onto shell 14a by means of threads 35 and the corresponding threads in member 36.

In Fig. 4 I show the device of Figs. 1 and 2 applied to a special use such as in combination with a case for eye glasses or spectacles. In this figure the case 10 is secured by suitable strap fasteners 37 or the equivalent 37, to a case 38. A removable cap or plug 12a is secured to the upper end of casing 10 to permit filling the device with a liquid suitable for cleaning spectacles. The device functions as the devices of Figs. 1 to 3 and is compact and conveniently available for supplying cleaning liquid for spectacles, as will be apparent.

Having described my invention, what I claim is:

1. A dispenser as described comprising a casing for a quantity of fluid having a dispensing aperture, a tube within said casing having a teat at one end adjacent said aperture, and means to reciprocate said tube whereby to force fluid from the interior of said casing through said tube and through said dispensing aperture, said means including an opening in said casing and a knurled surface on said tube registering with said opening.

2. A dispenser as described comprising a casing for a quantity of fluid having a dispensing aperture, a tube within said casing having a teat at one end adjacent said aperture, and means to reciprocate said tube whereby to force fluid from the interior of said casing through said casing and through said dispensing aperture, said means including an opening in said casing and a knurled surface on said tube registering with said opening, there being sealing means between said tube and said casing.

CARL L. LUDWIG.

REFERENCES CITED

The following references are of record in the file of this patent:

UNITED STATES PATENTS

| Number | Name | Date |
|---|---|---|
| 1,002,995 | Johnson | Sept. 12, 1911 |
| 1,046,408 | Voges | Dec. 3, 1912 |
| 1,541,861 | Shaw | June 16, 1925 |
| 1,938,219 | Eckerbom | Dec. 5, 1933 |
| 2,068,723 | Amos | Jan. 26, 1937 |
| 2,212,567 | Kirmes | Aug. 27, 1940 |
| 2,216,530 | Hollander | Oct. 1, 1940 |